(12) United States Patent
Xie et al.

(10) Patent No.: US 11,988,645 B2
(45) Date of Patent: May 21, 2024

(54) DYNAMIC TRUE TRIAXIAL ELECTROMAGNETIC HOPKINSON BAR SYSTEM

(71) Applicant: SHENZHEN UNIVERSITY., Guangdong (CN)

(72) Inventors: Heping Xie, Guangdong (CN); Yulong Li, Shaanxi (CN); Jianbo Zhu, Guangdong (CN); Tao Zhou, Guangdong (CN); Jian Zhao, Guangdong (SG); Tao Suo, Shaanxi (CN); Zhongbin Tang, Shaanxi (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 476 days.

(21) Appl. No.: 17/359,126

(22) Filed: Jun. 25, 2021

(65) Prior Publication Data
US 2021/0325287 A1 Oct. 21, 2021

Related U.S. Application Data

(63) Continuation of application No. PCT/CN2019/115478, filed on Nov. 5, 2019, and a
(Continued)

(30) Foreign Application Priority Data

Dec. 26, 2018 (CN) .......................... 201811601104.2
Dec. 26, 2018 (CN) .......................... 201811601112.7
Dec. 26, 2018 (CN) .......................... 201811601168.2

(51) Int. Cl.
*G01N 3/18* (2006.01)

(52) U.S. Cl.
CPC ....... *G01N 3/18* (2013.01); *G01N 2203/0098* (2013.01)

(58) Field of Classification Search
CPC ............ G01N 3/18; G01N 2203/0098; G01N 2203/0019; G01N 3/08; G01N 2203/0256; G01N 3/10; G01N 3/12; G01N 2203/0099
(Continued)

(56) References Cited

FOREIGN PATENT DOCUMENTS

| CN | 102135480 A | 7/2011 |
|---|---|---|
| CN | 202101910 A | 1/2012 |

(Continued)

OTHER PUBLICATIONS

The World Intellectual Property Organization (WIPO) International Search Report for PCT/CN2019/115478 Jan. 23, 2020 3 Pages (including translation).
(Continued)

*Primary Examiner* — Robert R Raevis
(74) *Attorney, Agent, or Firm* — ANOVA LAW GROUP, PLLC

(57) ABSTRACT

The present disclosure provides a dynamic true triaxial electromagnetic Hopkinson bar system, including a central cubic box, a horizontal cruciform support platform, and a central support platform, wherein the central cubic box is disposed in the center of the upper surface of the central support platform; the central cubic box and the horizontal cruciform support platform form an orthogonal coordinate system for precisely positioning and centering the dynamic true triaxial electromagnetic Hopkinson bar system; the confining-pressure loading systems, electromagnetic pulse generators, circular bulges, square bars, and self-lubricating square bar fixation and support frames in the directions X, Y, and Z are respectively symmetrically arranged by taking the central cubic box as a symmetric center; and the systems in the directions X, Y, and Z together construct the dynamic true triaxial electromagnetic Hopkinson bar system.

20 Claims, 11 Drawing Sheets

Related U.S. Application Data continuation of application No. PCT/CN2019/115480, filed on Nov. 5, 2019, and a continuation of application No. PCT/CN2019/115479, filed on Nov. 5, 2019.

(58) Field of Classification Search
USPC .................. 73/789, 790, 803, 813, 818, 825
See application file for complete search history.

(56) References Cited

FOREIGN PATENT DOCUMENTS

| | | | | | |
|---|---|---|---|---|---|
| CN | 104535409 | A | * | 4/2015 | ............... G01N 3/00 |
| CN | 104535409 | A | | 4/2015 | |
| CN | 204405454 | U | | 6/2015 | |
| CN | 105571961 | A | | 5/2016 | |
| CN | 205719826 | U | | 11/2016 | |
| CN | 106198227 | A | | 12/2016 | |
| CN | 107014690 | A | | 8/2017 | |
| CN | 108152155 | A | | 6/2018 | |
| CN | 108548942 | A | | 9/2018 | |
| CN | 108645562 | A | * | 10/2018 | ............. G01L 25/00 |
| CN | 109406310 | A | | 3/2019 | |
| CN | 109406311 | A | | 3/2019 | |
| CN | 109406313 | A | | 3/2019 | |
| CN | 109668775 | A | | 4/2019 | |
| GB | 2534679 | A | | 8/2016 | |
| KR | 101727405 | B1 | | 5/2017 | |

OTHER PUBLICATIONS

The World Intellectual Property Organization (WIPO) International Search Report for PCT/CN2019/115479 Jan. 23, 2020 3 Pages (including translation).
The World Intellectual Property Organization (WIPO) International Search Report for PCT/CN2019/115480 Jan. 23, 2020 3 Pages (including translation).
Hailiang Nie et al., "«Data Processing Method for Bidirectional-load Split Hopkinson Compression Bar»","«Explosion and Shock Waves»", May 31, 2018 (May 31, 2018).
Zhan-wei Liu et al., "On the Mini-SHPB Device Based on Multi-Level Electromagnetic Emissions", "Journal of Experimental Mechanics", vol. 28, No. 5, Oct. 2013, pp. 557-562.
Wei-Guo Guo et al., "Electromagnetic Driving Technique Applied to Split-Hopkinson Pressure Bar Device", "Journal of Experimental Mechanics", vol. 25, No. 6, Dec. 2010, pp. 682-689.

* cited by examiner

DYNAMIC TRUE TRIAXIAL ELECTROMAGNETIC HOPKINSON BAR SYSTEM

CROSS-REFERENCES TO RELATED APPLICATIONS

This application is a Bypass Continuation Application of PCT Patent Application No. PCT/CN2019/115478, filed on Nov. 5, 2019, which claims priority to Chinese Patent Application No. 201811601112.7, filed on Dec. 26, 2018. This application is also a continuation application of PCT Patent Application No. PCT/CN2019/115479, filed on Nov. 5, 2019, which claims priority to Chinese Patent Application No. 201811601168.2, filed on Dec. 26, 2018. This application is also a continuation application of PCT Patent Application No. PCT/CN2019/115480, filed on Nov. 5, 2019, which claims priority to Chinese Patent Application No. 201811601104.2, filed on Dec. 26, 2018. The content of all aforesaid applications is incorporated herein by reference.

TECHNICAL FIELD

The present disclosure relates to the field of testing dynamic mechanical properties of materials such as rock and concrete, and more particularly to a dynamic true triaxial electromagnetic Hopkinson bar system.

BACKGROUND

The existing apparatuses for testing dynamic properties of materials such as rock and concrete include one-dimensional split Hopkinson pressure bar, coupled dynamic-static loading triaxial split Hopkinson pressure bar, one-dimensional Hopkinson bar bundle, and unidirectional impact loading split Hopkinson pressure bar based on true triaxial static load. In a method for studying dynamic properties of materials such as rock and concrete based on the split Hopkinson pressure bar apparatus, the loading could only be applied by one-dimensional impact at the beginning, and then the coupled static-dynamic unidirectional impact loading method with pre-applied static confining pressure load was invented.

In complex engineering problems, the materials such as rock and concrete often bear impact loads in multiple directions or unequal geostresses in three directions; furthermore, biaxial or triaxial impact loads may be simultaneously or asynchronously applied to the materials such as rock and concrete (for example, millisecond delay blasting during blasting). At present, the general apparatus for studying dynamic properties of the materials such as rock and concrete under impact loading in the world is the split Hopkinson bar, which can generally only realize the coupled static-dynamic loading with or without circumferential confining pressure under unidirectional impact. The utility model No. 201620574575.9 introduced a unidirectional impact loading based true triaxial split Hopkinson pressure bar apparatus; the apparatus can simultaneously apply triaxial static prestresses to a rock specimen (the stresses in three principal directions satisfy $\sigma_1 \neq \sigma_2 \cdot \sigma_3$) at first, and then give an unidirectional impact, thereby realizing the loading of unidirectional impact to the rock specimen with true triaxial static prestresses. However, a triaxial split Hopkinson pressure bar test under unidirectional impact loading cannot truly reflect the dynamic mechanical behavior of the materials such as rock and concrete when the impacts are simultaneously or asynchronously loaded in multiple directions; furthermore, the test cannot consider the influence of the temperature field on rock specimen in real time, and especially cannot consider the case of real-time temperature and pressure coupled loading. In addition, a true triaxial compression bar is not precise and reliable in centering, the compression bar and the test specimen would be easily eccentric during centering, therefore, the compression bar would be easily damaged due to an eccentric moment generated between the compression bar and the test specimen in the process of dynamic impact with high-amplitude, and the test results will be unreliable. Therefore, the above technical problems in the prior art needs to be solved.

SUMMARY

The objective of the present invention is to provide a dynamic true triaxial electromagnetic Hopkinson bar system which can perform a dynamic true triaxial impact loading test under the coupling action of an in-situ real time temperature and a true triaxial static confining pressure, can maintain the confining pressure relatively stable during testing process (i.e., displacement control or stress control), and can conduct experiments under the situation that different temperature fields and stress fields are successively or simultaneously applied, and thereby can provide a more precise and reliable experimental result.

In order to solve the problem in the prior art, the present disclosure provides a dynamic true triaxial electromagnetic Hopkinson bar system, including a central cubic box, wherein confining-pressure loading systems, electromagnetic pulse generators, square bars, circular bulges, and self-lubricating square bar fixation and support frames in the directions $X_+$, $X_-$, $Y_+$, $Y_-$, $Z_+$, and $Z_-$ are respectively symmetrically arranged by taking the central cubic box as a symmetric center; the central cubic box completely opens in the $Z_+$ direction; a square opening is disposed at the center of the central cubic box in each direction of $X_+$, $X_-$, $Y_+$, $Y_-$, and $Z_-$, respectively; the size of the square openings is the same as that of the square bar; the central cubic box is disposed in the center of an upper surface of the central support platform; the central cubic box and the horizontal cruciform support platform form an orthogonal coordinate system; and the six systems in the directions $X_+$, $X_-$, $Y_+$, $Y_-$, $Z_+$, and $Z_-$ together construct the dynamic true triaxial electromagnetic Hopkinson bar system.

Further, the confining-pressure loading system includes a confining-pressure loading hydraulic cylinder, a confining-pressure loading actuator, and a confining-pressure loading frame, wherein the confining-pressure loading frames in the directions $X_+$, $X_-$, $Y_+$, $Y_-$, $Z_+$, and $Z_-$ are respectively symmetrically arranged by taking the central cubic box as a symmetric center; by taking the central cubic box as a symmetric center, the confining-pressure loading hydraulic cylinder and the confining-pressure loading actuator are arranged in one of the directions $X_+$ and $X_-$; the confining-pressure loading hydraulic cylinder and the confining-pressure loading actuator are arranged in one of the directions $Y_+$ and $Y_-$; and the confining-pressure loading hydraulic cylinder and the confining-pressure loading actuator are arranged in one of the directions $Z_+$ and $Z_-$.

In one aspect of the present disclosure, the dynamic true triaxial electromagnetic Hopkinson bar system includes a synchronous-servo-controlled static-dynamic-stress loading system, wherein the square bar in the synchronous-servo-controlled static-dynamic-stress loading system is fixed by the self-lubricating square bar fixation and support frame; the square bar and the central cubic box are centered and connected at the square opening; the confining-pressure loading hydraulic cylinder, the confining-pressure loading actuator, and the confining-pressure loading frame are combined in series; the electromagnetic pulse generator is placed in the confining-pressure loading frame at an incident end of the square bar, and is freely and closely adhered to the incident end of the square bar; the confining-pressure loading frame and the circular bulge are combined in series; the circular bulge is located at the incident end of the square bar, and the distance between the circular bulge and the incident end of the square bar is 3%-7% of the length of the square bar.

Further, the distance from the circular bulge to a loading end of an incident stress wave of the square bar is 3%-7% of the length of the square bar.

Further, the length of the circular bulge is 1.5%-4% of the length of the square bar.

Further, the diameter of the circular bulge is 1.5-2.5 times the side length of the cross section of the square bar.

Further, the dynamic true triaxial electromagnetic Hopkinson bar system also includes a square bar centering and positioning guide rail, wherein the square bar and the central cubic box are centered and connected at the square opening along the square bar centering and positioning guide rail.

Further, the dynamic true triaxial electromagnetic Hopkinson bar system also includes an electromagnetic pulse generator support frame, wherein the electromagnetic pulse generator support frame is placed in the confining-pressure loading frame at the incident end of the square bar; and the electromagnetic pulse generator support frame supports the electromagnetic pulse generator.

Further, a link support bar, a confining-pressure loading end baffle, and a confining-pressure loading and fixing end baffle are disposed in the directions $X_+$, $X_-$, $Y_+$, and $Y_-$, respectively; the confining-pressure loading end baffle and the confining-pressure loading and fixing end baffle are connected to the central cubic box by means of the link support bar.

Further, a vertical fixation and support frame is disposed in the directions $Z_+$ and $Z_-$, respectively; the vertical fixation and support frame is connected to the central cubic box, and provides a frame fixation and counterforce supporting system for applying static confining pressures in the directions $Z_+$ and $Z_-$.

In another aspect of the present disclosure, the dynamic true triaxial electromagnetic Hopkinson bar system also includes a positioning and centering system, wherein the positioning and centering system includes a positioning, guiding and centering box, wherein the positioning, guiding and centering box is a cube; a square hole is reserved on each surface of the positioning, guiding and centering box; the size of the square holes on the six surfaces of the positioning, guiding and centering box is consistent with the size of the square bar of the Hopkinson bar; the size of an inner cavity of the positioning, guiding and centering box is consistent with the size of the cubic test specimen; and the positioning, guiding and centering box is designed to have four symmetric parts.

Further, circular holes are respectively reserved on each surface of the positioning, guiding and centering box; the size of the circular holes is consistent with the size of a threaded rod; the four parts of the positioning, guiding and centering box are connected by means of the threaded rods and nuts, so that the detachable positioning, guiding and centering box is combined to form an overall structure.

Further provided is a method for using the dynamic true triaxial electromagnetic Hopkinson bar system to perform positioning and centering, including the following steps:

assembling the positioning, guiding and centering box: firstly, connecting two lower parts of the positioning, guiding and centering box; then, mounting a third part; next, connecting the two lower parts to the upper third part; then, mounting a cubic test specimen before mounting and fixedly connecting the final part to form a complete positioning and centering apparatus;

mounting a positioning, guiding and centering box cushion block, the positioning, guiding and centering box cushion block is a detachable cushion block: firstly, placing the positioning, guiding and centering box cushion block in the center of a bottom surface of the central cubic box; then, using a bolt to fix the positioning, guiding and centering box cushion block in the center of the bottom surface of the central cubic box by means of a bolt positioning hole, so as to provide an auxiliary platform for quickly and precisely mounting the positioning, guiding and centering box in the center of the central cubic box;

after completing the above step, placing the positioning, guiding and centering box in the center of an upper surface of the positioning, guiding and centering box cushion block; then, using bolts to fix the positioning, guiding and centering box in the center of the upper surface of the positioning, guiding and centering box cushion block by means of bolt positioning holes, so that the positioning, guiding and centering box is mounted in the center of the central cubic box, and the positioning, guiding and centering box and the square holes on each side of the center cube box for installing the square bars are completely centered and aligned; next, placing the square bars along both sides of the square holes in directions X, Y, and Z of the central cubic box and the positioning, guiding and centering box, respectively, so as to complete the step of quick and precise positioning and centering;

after completing the above step, using an infrared laser measuring instrument to assist the quick and precise alignment of triaxial bars in six directions; the operating principle is explained as follows by taking the direction X as an example: before the precise centering, a square bar in the direction $X_-$ is placed at an edge of the central cubic box; the infrared laser measuring instrument is disposed at a position A, and emits an infrared laser from the position A; the infrared laser reaches a position B; therefore, the distance between A and B can be measured; after the precise centering, the square bar in the direction $X_-$ contacts the cubic test specimen; a position of the infrared laser measuring instrument remains unchanged relative to the square bar in the direction $X_-$ during alignment; at this time, the infrared laser measuring instrument is at a position $A_1$, and the infrared laser reaches a position $B_1$; therefore, the distance between $A_1$ and $B_1$ can be measured; the difference between the two measured distances is a distance between C and D; line EF is a center line of the cubic test specimen and the central cubic box; EG is half of a side length of the central cubic box; HI is half of a side length of the cubic test specimen; if the distance CD is equal to the difference between a half of the side length of the central cubic box and a half of the side length of the cubic test specimen, namely CD=EG−HI, then the precise centering and alignment have been completed in the direction X, and subsequent operations and testing processes can be continued.

In another aspect of the present disclosure, the dynamic true triaxial electromagnetic Hopkinson bar system further includes a temperature control system, wherein the temperature control system includes a temperature control apparatus; the temperature control apparatus includes a temperature control cabinet; heating holes are built in the temperature control cabinet; heating rods with lead wires are placed in the heating holes; the volume of a hearth of the temperature control cabinet is 1.5-2.5 times that of the test specimen; a square hole is respectively reserved on each surface of the temperature control cabinet; the size of the square holes on the six surfaces of the temperature control cabinet is consistent with the size of the cross section of the square bar of the Hopkinson bar; and the temperature control cabinet is designed to have four symmetric parts.

Further provided is a method for using the dynamic true triaxial electromagnetic Hopkinson bar system to control temperature, including the following steps:

after completing the positioning and centering of the positioning and centering system, disassembling the positioning, guiding and centering box and the positioning, guiding and centering box cushion block; then mounting the temperature control cabinet, and performing the heating step;

assembling the temperature control cabinet: firstly, connecting a first part and a second part of the temperature control cabinet; then, mounting a third part; next, connecting the first part and the second part to the third part; and finally mounting and fixedly connecting a fourth part of the temperature control cabinet to form a complete temperature control apparatus;

mounting the temperature control cabinet cushion block: assembling the temperature control cabinet cushion block which is disposed in the central cubic box, and placing the temperature control cabinet cushion block in the center of a bottom surface of the central cubic box;

after completing the above step, placing the temperature control cabinet in the center of an upper surface of the temperature control cabinet cushion block, and locating a test specimen in the center of the temperature control cabinet, so as to complete a plurality of mounting steps of the temperature control system of the dynamic true triaxial electromagnetic Hopkinson bar system;

after completing the above step, heating the test specimen, controlling a thermocouple by means of a temperature control software system, setting a temperature rise rate and a temperature range; then, feeding back a real-time temperature to a display software system by means of an intelligent temperature control sensor, thereby ensuring heating to a preset temperature, and then maintaining the test specimen in a constant temperature state;

After completing the above step, applying static prestress to the test specimen using the synchronous-servo-controlled static-dynamic-stress loading system; after the static prestress is applied, applying an impact load to the test specimen, so as to achieve dynamic true triaxial loading tests on the cubic test specimen under the in situ coupled action of temperature and static pressure.

Further, the temperature range is from normal temperature to 1000° C.

Further, the temperature range is preferably 20° C.-300° C.

The beneficial effects of the present disclosure are:
(1) The structural design of the positioning, guiding and centering box, the positioning, guiding and centering box cushion block, and the central cubic box can ensure that the test specimen of rock or concrete material can be quickly positioned and centered in the dynamic true triaxial Hopkinson bar tests.
(2) The auxiliary installation system of infrared laser measuring instrument ensures that the triaxial and six-directional bars are quickly and precisely aligned and mounted.
(3) The apparatus and method of the present disclosure facilitate the quick centering and alignment of the triaxial and six-directional bars, ensure that the bars and the test specimen would not be eccentric, so that the bar would not be damaged due to an eccentric moment generated between the bar and the test specimen in the process of a high-amplitude dynamic impact loading, thereby ensuring the test results to be reliable.
(4) The configuration of the circular bulges can ensure that the incident end of the Hopkinson bar is a free end after a static confining pressure is applied to the test specimen; the present disclosure solves the problem that the conventional static-dynamic combined Hopkinson bar system cannot ensure the ends of Hopkinson incident bar and transmission bar are in free state after a static prestress is applied to the specimen, thereby providing a test condition for applying an electromagnetically excited stress pulse and performing an ultrasonic test with in situ pressure retaining state.
(5) The synchronous-servo-controlled static-dynamic-stress loading system can synchronously apply true triaxial static confining pressures to the specimen in a dynamic true triaxial electromagnetic Hopkinson bar test, and achieve servo control of the confining pressure during testing (i.e., displacement control and stress control).
(6) The present disclosure can achieve loading the super-high true triaxial static confining pressure of a 300 MPa (which simulates an in situ stress at 10000 m depth), and overcomes the defect that the prior art cannot apply a super-high static confining pressure to simulate the in situ stress at 10000 m depth.
(7) The present disclosure enables the test specimen to be heated in in-situ condition and maintained at a constant temperature, and can carry out experimental research under dynamic true triaxial impact loading at different temperatures.
(8) The present disclosure enables a researcher to conduct experiments subjected to true triaxial impact loading to study dynamic damage evolution and failure laws of the materials such as rock and concrete under successive or simultaneous action of different temperatures and stresses.
(9) The present disclosure fills the gap that a temperature-pressure coupling test cannot be performed when a dynamic impact, especially a true triaxial dynamic-static combined impact, is applied to the materials such as rock and concrete.

Figure 1:
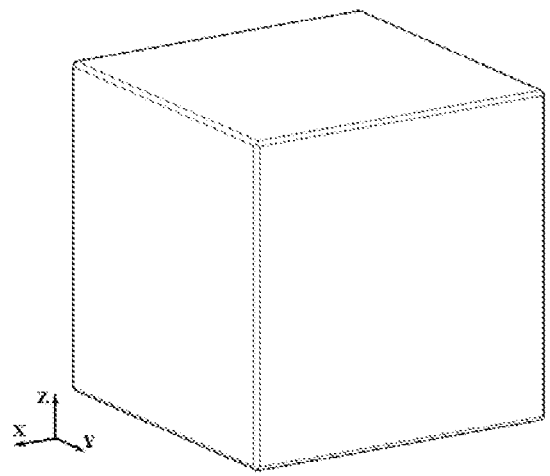
FIG. 1 is a schematic view of a cubic test specimen in a dynamic true triaxial electromagnetic Hopkinson bar system according to the present disclosure.

Reference signs corresponding to the components in the figures are as follows:

1, support platform in the direction $X_+$; 2, confining-pressure loading hydraulic cylinder in the direction $X_+$; 3, confining-pressure loading end baffle in the direction $X_+$; 4, confining-pressure loading actuator in the direction $X_+$; 5, electromagnetic pulse generator support frame in the direction $X_+$; 6, electromagnetic pulse generator in the direction $X_+$; 7, confining-pressure loading frame in the direction $X_+$; 8, circular bulge in the direction $X_+$; 9, link support bar in the direction $X_+$; 10, square bar in the direction $X_+$; 11, self-lubricating square bar fixation and support frame in the direction $X_+$; 12, square bar centering and positioning guide rail in the direction $X_+$; 13, confining-pressure loading and fixing end baffle in the direction $X_-$; 14, electromagnetic pulse generator in the direction $X_-$; 15, square bar centering and positioning guide rail in the direction $X_-$; 16, link support bar in the direction $X_-$; 17, confining-pressure loading frame in the direction $X_-$; 18, self-lubricating square bar fixation and support frame in the direction $X_-$; 19, electromagnetic pulse generator support frame in the direction $X_-$; 20, circular bulge in the direction $X_-$; 21, square bar in the direction $X_-$; 22, support platform in the direction $X_-$; 23, confining-pressure loading end baffle in the direction $Y_+$; 24, confining-pressure loading hydraulic cylinder in the direction $Y_+$; 25, support platform in the direction $Y_+$; 26, square bar centering and positioning guide rail in the direction $Y_+$; 28, electromagnetic pulse generator support frame in the direction $Y_+$; 29, electromagnetic pulse generator in the direction $Y_+$; 30, link support bar in the direction $Y_+$; 31, confining-pressure loading frame in the direction $Y_+$; 32, circular bulge in the direction $Y_+$; 33, self-lubricating square bar fixation and support frame in the direction $Y_+$; 34, square bar in the direction $Y_+$; 35, confining-pressure loading and fixing end baffle in the direction $Y_-$; 36, link support bar in the direction $Y_-$; 37, confining-pressure loading frame in the direction $Y_-$; 38, square bar centering and positioning guide rail in the direction $Y_-$; 39, support platform in the direction $Y_-$; 40, electromagnetic pulse generator in the direction $Y_-$; 41, electromagnetic pulse generator support frame in the direction $Y_-$; 42, circular bulge in the direction $Y_-$; 43, square bar in the direction $Y_-$; 44, self-lubricating square bar fixation and support frame in the direction $Y_-$; 45, confining-pressure loading hydraulic cylinder in the direction $Z_+$; 47, confining-pressure loading frame in the direction $Z_+$; 48, electromagnetic pulse generator support frame in the direction $Z_+$; 49, electromagnetic pulse generator in the direction $Z_+$; 50, vertical fixation and support frame in the direction $Z_+$; 51, circular bulge in the direction $Z_+$; 52, self-lubricating square bar fixation and support frame in the direction $Z_+$; 53, square bar in the direction $Z_+$; 54, square bar centering and positioning guide rail in the direction $Z_+$; 55, self-lubricating square bar fixation and support frame in the direction $Z_-$; 56, vertical fixation and support frame in the direction $Z_-$; 57, electromagnetic pulse generator in the direction $Z_-$; 58, confining-pressure loading frame in the direction $Z_-$; 59, square bar centering and positioning guide rail in the direction $Z_-$; 60, square bar in the direction $Z_-$; 61, circular bulge in the direction $Z_-$; 62, electromagnetic pulse generator support frame in the direction $Z_-$; 63, central cubic box; 64, cubic test specimen; 65, central support platform; 66, temperature control cabinet; 67, first part of the temperature control cabinet; 68, second part of the temperature control cabinet; 69, third part of the temperature control cabinet; 70, fourth part of the temperature control cabinet; 71, bolt connecting hole of the temperature control cabinet; 72, heating hole; 73, heating rod; 74, lead wire; 75, temperature control cabinet cushion block; 76, first part of the positioning, guiding and centering box; 77, second part of the positioning, guiding and centering box; 78, third part of the positioning, guiding and centering box; 79, fourth part of the positioning, guiding and centering box; 80, positioning, guiding and centering box; 81, bolt positioning hole of the positioning, guiding and centering box cushion block; 82, bolt positioning hole of the positioning, guiding and centering box; 83, bolt connecting hole of the positioning, guiding and centering box; 84, positioning, guiding and centering box cushion block; and 85, link connecting hole of the central cubic box.

DETAILED DESCRIPTION OF THE EMBODIMENTS

The present disclosure will be further described hereafter with reference to the accompanying drawings.

Figure 2:
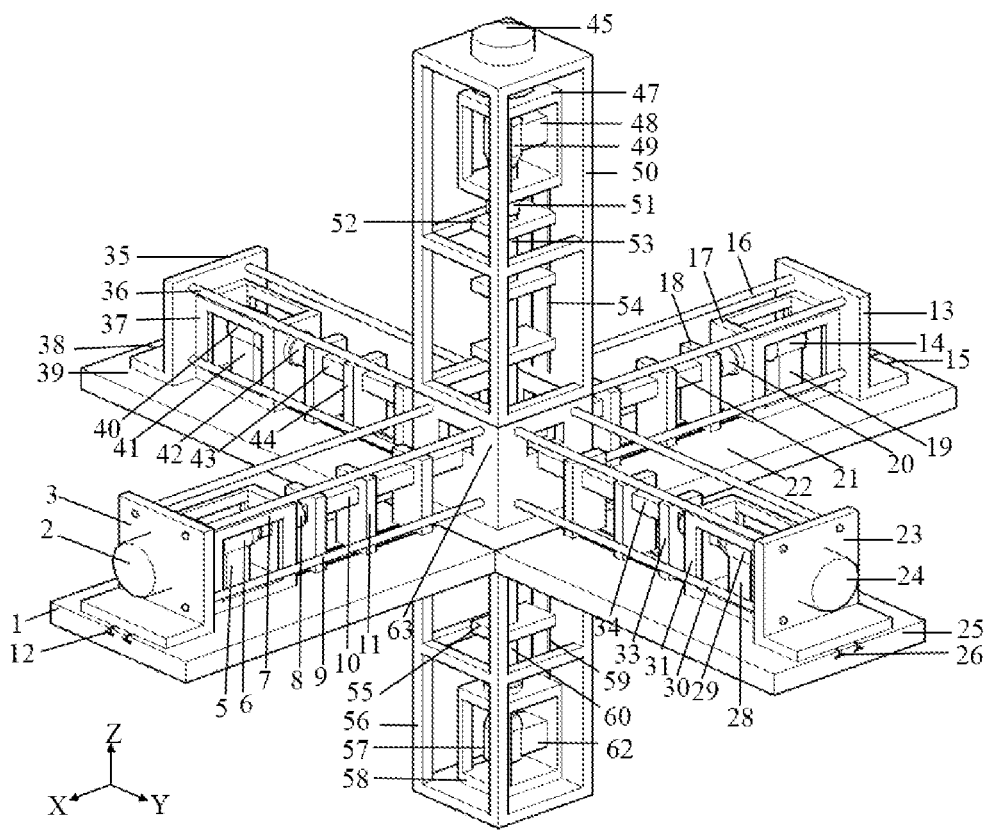
FIG. 2 is a three-dimensional schematic view of the dynamic true triaxial electromagnetic Hopkinson bar system according to the present disclosure.

The present disclosure provides a dynamic true triaxial electromagnetic Hopkinson bar system. FIG. 2 is a three-dimensional view of the dynamic true triaxial electromagnetic Hopkinson bar system. The test apparatus is placed on a horizontal cruciform support platform; the platform includes a support platform in the direction $X_+$ 1, a support platform in the direction $X_-$ 22, a support platform in the direction $Y_+$ 25, a support platform in the direction $Y_-$ 39, and a central support platform 65. The upper surface (in the direction $Z_+$) of the central cubic box 63 completely opens; a square opening is disposed at the center of the central cubic box in each direction of $X_+$, $X_-$, $Y_+$, $Y_-$, and $Z_-$, respectively; the size of the square openings is the same as that of the square bar; the central cubic box 63 is disposed in the center of an upper surface of the central support platform 65; the central cubic box and the horizontal cruciform support platform form an orthogonal coordinate system for precisely positioning and centering the dynamic true triaxial electromagnetic Hopkinson bar system.

The confining-pressure loading systems, electromagnetic pulse generators, the square bars, and the self-lubricating square bar fixation and support frames in the directions $X_+$, $X_-$, $Y_+$, $Y_-$, $Z_+$, and $Z_-$ are respectively symmetrically arranged by taking the central cubic box 63 as a symmetric center, so as to construct the dynamic true triaxial electromagnetic Hopkinson bar system, wherein the square bar in the direction $X_+$ 10 is fixed by the self-lubricating square bar fixation and support frame in the direction $X_+$ 11; the square bar in the direction $X_+$ 10 and the central cubic box 63 are centered and connected at the square opening in the direction $X_+$ along the square bar centering and positioning guide rail in the direction $X_+$ 12; the confining-pressure loading hydraulic cylinder in the direction $X_+$ 2, the confining-pressure loading actuator in the direction $X_+$ 4, and the confining-pressure loading frame in the direction $X_+$ 7 are combined in series; the electromagnetic pulse generator in the direction $X_+$ 6 and the electromagnetic pulse generator support frame in the direction $X_+$ 5 are placed at the incident end of the square bar in the direction $X_+$ 10 in the confining-pressure loading frame in the direction $X_+$ 7, and are freely and closely attached to the incident end of the square bar in the direction $X_+$ 10; the confining-pressure loading frame in the direction $X_+$ 7 is connected to the circular bulge in the direction $X_+$ 8 in series, and is used to apply a static confining pressure and a dynamic stress pulse load in the direction $X_+$ to the cubic test specimen 64 along the incident end of the square bar in the direction $X_+$ 10; the link support bar in the direction $X_+$ 9 connects the confining-pressure loading end baffle in the direction $X_+$ 3 to the central cubic box 63, so as to provide a frame fixation and counterforce support system for applying the static confining pressure in the direction $X_+$. The square bar in the direction $X_-$ 21 is fixed by the self-lubricating square bar fixation and support frame in the direction $X_-$ 18; the square bar in the direction $X_-$ 21 and the central cubic box 63 are centered and connected at the square opening in the direction $X_-$ along the square bar centering and positioning guide rail in the direction $X_-$ 15; the electromagnetic pulse generator in the direction $X_-$ 14 and the electromagnetic pulse generator support frame in the direction $X_-$ 19 are placed at the incident end of the square bar in the direction $X_-$ 21 in the confining-pressure loading frame in the direction $X_-$ 17, and are freely and closely attached to the incident end of the square bar in the direction $X_-$ 21; the confining-pressure loading frame in the direction $X_-$ 17 is connected to the circular bulge in the direction $X_-$ 20, and is used to apply a static confining pressure and a dynamic stress pulse load in the direction $X_-$ to the cubic test specimen 64 along the incident end of the square bar in the direction $X_-$ 21; the link support bar in the direction $X_-$ 16 connects the confining-pressure loading and fixing end baffle in the direction $X_-$ 13 to the central cubic box 63, so as to provide a frame fixation and counterforce support system for applying the static confining pressure in the direction $X_-$. The square bar in the direction $Y_+$ 34 is fixed by the self-lubricating square bar fixation and support frame in the direction $Y_+$ 33; the square bar in the direction $Y_+$ 34 and the central cubic box 63 are centered and connected at the square opening in the direction $Y_+$ along the square bar centering and positioning guide rail in the direction $Y_+$ 26; the confining-pressure loading hydraulic cylinder in the direction $Y_+$ 24, the confining-pressure loading actuator in the direction $Y_+$, and the confining-pressure loading frame in the direction $Y_+$ 31 are combined in series; the electromagnetic pulse generator in the direction $Y_+$ 29 and the electromagnetic pulse generator support frame in the direction $Y_+$ 28 are placed at the incident end of the square bar in the direction $Y_+$ 34 in the confining-pressure loading frame in the direction $Y_+$ 31, and are freely and closely attached to the incident end of the square bar in the direction $Y_+$ 34; the confining-pressure loading frame in the direction $Y_+$ 31 is connected to the circular bulge in the direction $Y_+$ 32 in series, and is used to apply a static confining pressure and a dynamic stress pulse load in the direction $Y_+$ to the cubic test specimen 64 along the incident end of the square bar in the direction $Y_+$ 34; the link support bar in the direction $Y_+$ 30 connects the confining-pressure loading end baffle in the direction $Y_+$ 23 to the central cubic box 63, so as to provide a frame fixation and counterforce support system for applying the static confining pressure in the direction $Y_+$. The square bar in the direction $Y_-$ 43 is fixed by the self-lubricating square bar fixation and support frame in the direction $Y_-$ 44; the square bar in the direction $Y_-$ 43 and the central cubic box 63 are centered and connected at the square opening in the direction $Y_-$ along the square bar centering and positioning guide rail in the direction $Y_-$ 38; the electromagnetic pulse generator in the direction $Y_-$ 40 and the electromagnetic pulse generator support frame in the direction $Y_-$ 41 are placed at the incident end of the square bar in the direction $Y_-$ 43 in the confining-pressure loading frame in the direction $Y_-$ 37, and are freely and closely attached to the incident end of the square bar in the direction $Y_-$ 43; the confining-pressure loading frame in the direction $Y_-$ 37 is connected to the circular bulge in the direction $Y_-$ 42, and is used to apply a static confining pressure and a dynamic stress pulse load in the direction $Y_-$ to the cubic test specimen 64 along the incident end of the square bar in the direction $Y_-$ 43; the link support bar in the direction $Y_-$ 36 connects the confining-pressure loading and fixing end baffle in the direction $Y_-$ 35 to the central cubic box 63, so as to provide a frame fixation and counterforce support system for applying the static confining pressure in the direction $Y_-$. The square bar in the direction $Z_+$ 53 is fixed by the self-lubricating square bar fixation and support frame in the direction $Z_+$ 52; the square bar in the direction $Z_+$ 53 and the central cubic box 63 are centered and connected at the square opening in the direction $Z_+$ along the square bar centering and positioning guide rail in the direction $Z_+$ 54; the confining-pressure loading hydraulic cylinder in the direction $Z_+$ 45, the confining-pressure loading actuator in the direction $Z_+$, and the confining-pressure loading frame in the direction $Z_+$ 47 are combined in series; the electromagnetic pulse generator in the direction $Z_+$ 49 and the electromagnetic pulse generator support frame in the direction $Z_+$ 48 are placed at the incident end of the square bar in the direction $Z_+$ 53 in the confining-pressure loading frame in the direction $Z_+$ 47, and are freely and closely attached to the incident end of the square bar in the direction $Z_+$ 53; the confining-pressure loading frame in the direction $Z_+$ 47 is connected to the circular bulge in the direction $Z_+$ 51 in series, and is used to apply a static confining pressure and a dynamic stress pulse load in the direction $Z_+$ to the cubic test specimen 64 along the incident end of the square bar in the direction $Z_+$ 53; the vertical fixation and support frame in the direction $Z_+$ 50 is connected to the central cubic box 63 to provide a frame fixation and counterforce support system for applying the static confining pressure in the direction $Z_+$. The square bar in the direction $Z_-$ 60 is fixed by the self-lubricating square bar fixation and support frame in the direction $Z_-$ 55; the square bar in the direction $Z_-$ 60 and the central cubic box 63 are centered and connected at the square opening in the direction $Z_-$ along the square bar centering and positioning guide rail in the direction $Z_-$ 59; the electromagnetic pulse generator in the direction $Z_-$ 57 and the electromagnetic pulse generator support frame in the direction $Z_-$ 62 are placed at the incident end of the square bar in the direction $Z_-$ 60 in the confining-pressure loading frame in the direction $Z_-$ 58, and are freely and closely attached to the incident end of the square bar in the direction $Z_-$ 60; the confining-pressure loading frame in the direction $Z_-$ 58 is connected to the circular bulge in the direction $Z_-$ 61, and is used to apply a static confining pressure and a dynamic stress pulse load in the direction $Z_-$ to the cubic test specimen 64 along the incident end of the square bar in the direction $Z_-$ 60; the vertical fixation and support frame in the direction $Z_-$ 56 is connected to the central cubic box 63 to provide a frame fixation and counterforce support system for applying the static confining pressure in the direction $Z_-$.

Figure 3:
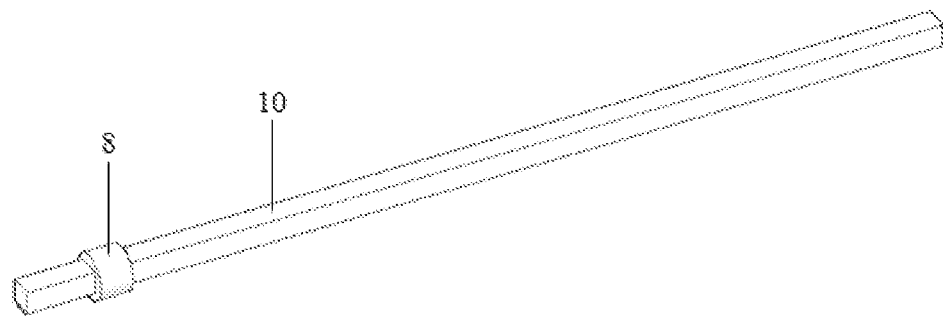
FIG. 3 is a three-dimensional schematic view of a square bar and a circular bulge of the dynamic true triaxial electromagnetic Hopkinson bar system according to the present disclosure.
Figure 4:
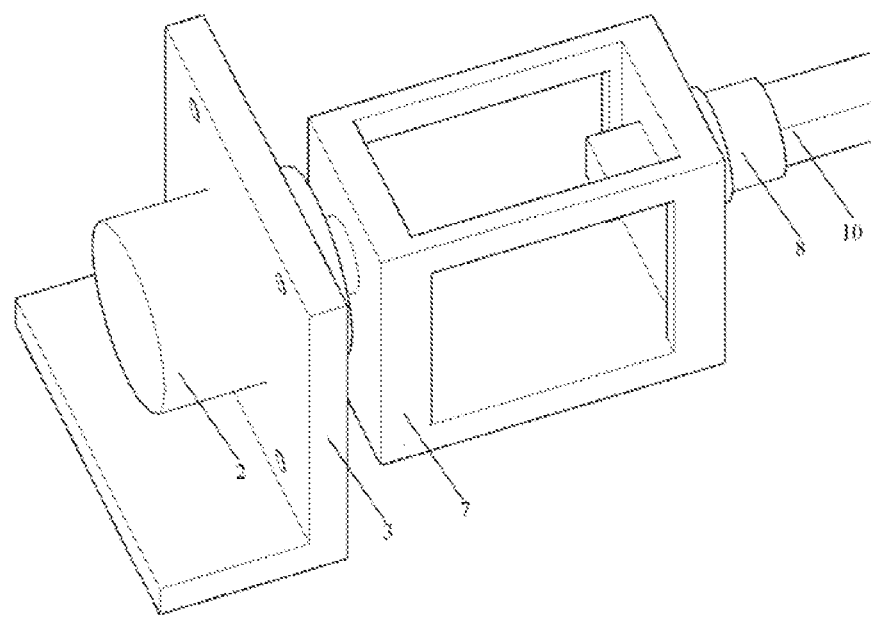
FIG. 4 is a three-dimensional schematic view showing the connection of the circular bulge and a confining-pressure loading system of the dynamic true triaxial electromagnetic Hopkinson bar system according to the present disclosure.
Figure 5:
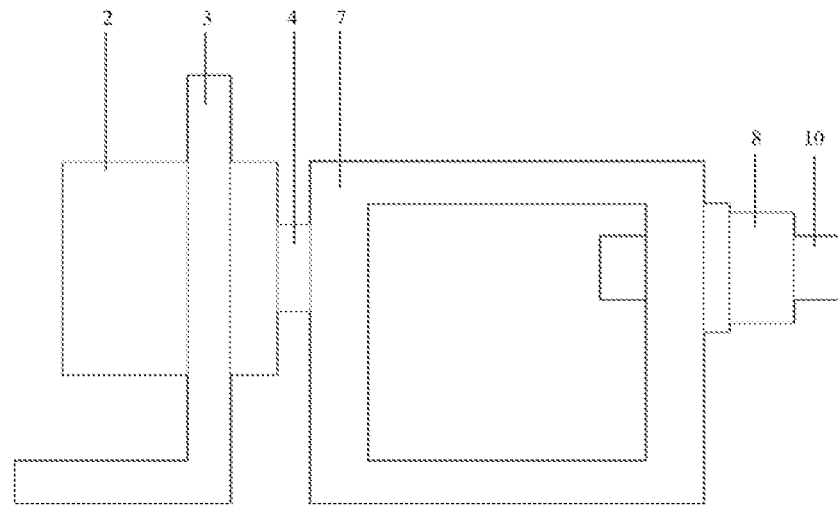
FIG. 5 is a two-dimensional front view showing the connection of the circular bulge and a confining-pressure loading system of the dynamic true triaxial electromagnetic Hopkinson bar system according to the present disclosure.

As shown in FIG. 3-5, the circular bulge 8 is placed at the incident end of the square bar 10; the distance from the circular bulge to the loading end of the incident stress wave of the square bar is about 3%-7% of the length of the square bar; the length of the circular bulge can be 1.5%-4% of the length of the square bar; and the diameter of the circular bulge can be 1.5-2.5 times the side length of the cross section of the square bar.

In one embodiment of the present disclosure, the dynamic true triaxial electromagnetic Hopkinson bar system further includes a positioning and centering system.

Figure 6A:
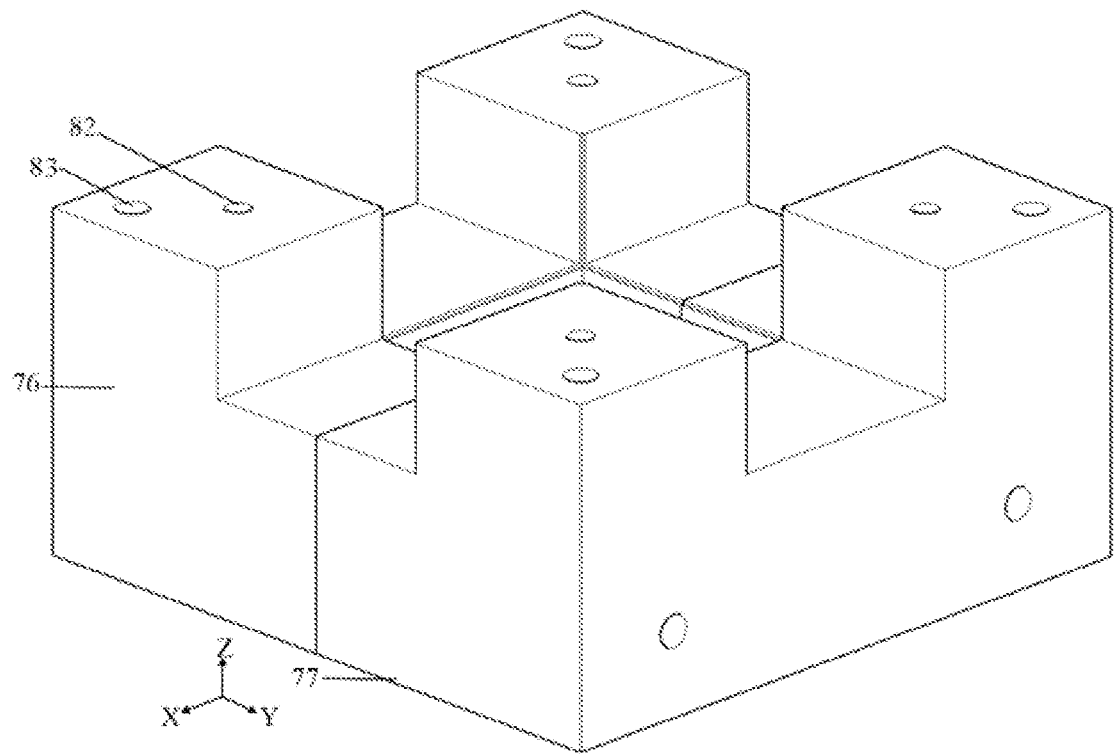
FIGS. 6a and 6b are schematic views showing the installation of a positioning, guiding and centering box of the dynamic true triaxial electromagnetic Hopkinson bar system according to the present disclosure.
Figure 6B:
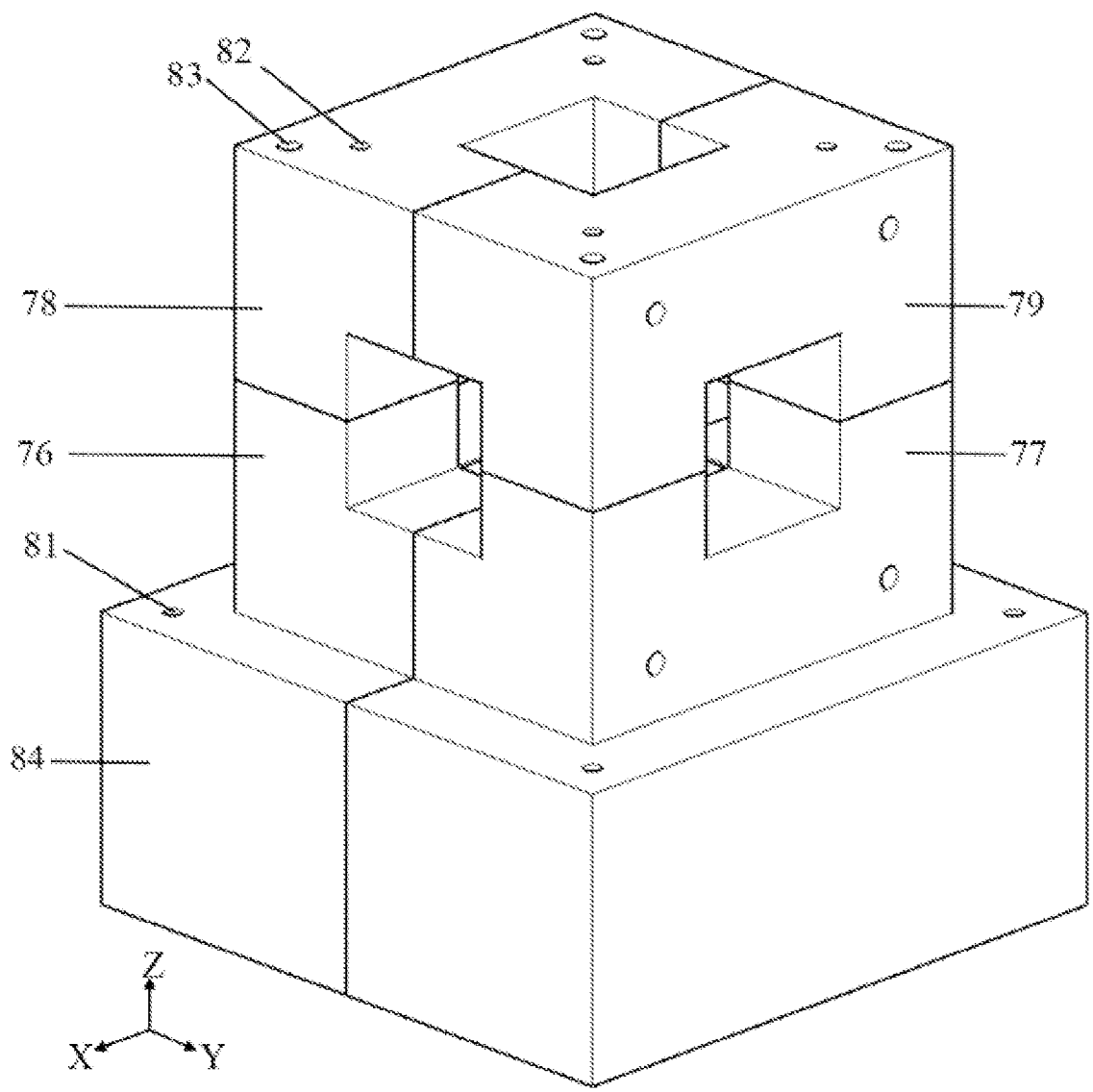

A precise positioning and centering apparatus of the dynamic true triaxial electromagnetic Hopkinson bar system is the core of the positioning and centering system of the dynamic true triaxial electromagnetic Hopkinson bar system. The precise positioning and centering apparatus includes a positioning, guiding and centering box and an infrared laser alignment system. Circular holes and a square hole are respectively reserved on each surface of the positioning, guiding and centering box; the size of the square holes on the six surfaces of the positioning, guiding and centering box is the same as the size of the square bar; the square bar passes through the square holes and contacts the cubic test specimen; the size of the circular holes is the same as the size of the threaded rods; the circular holes are used to combine the detachable positioning, guiding and centering box to form an overall structure, and to quickly and accurately mount the positioning, guiding and centering box in the center of the central cubic box;

the size of the inner cavity of the positioning, guiding and centering box is consistent with the size of the cubic test specimen. FIG. 1 is a cubic test specimen 64. The cubic test specimen 64 is provided with a 0.5 mm-2 mm chamfer at each edge thereof, so as to leave enough deformation space for the test specimen and to prevent square bars from being damaged by impacting each other due to the squeezing and deformation of the test specimen. FIGS. 6a and 6b are schematic views showing the installation of the positioning, guiding and centering box.

Figure 7:
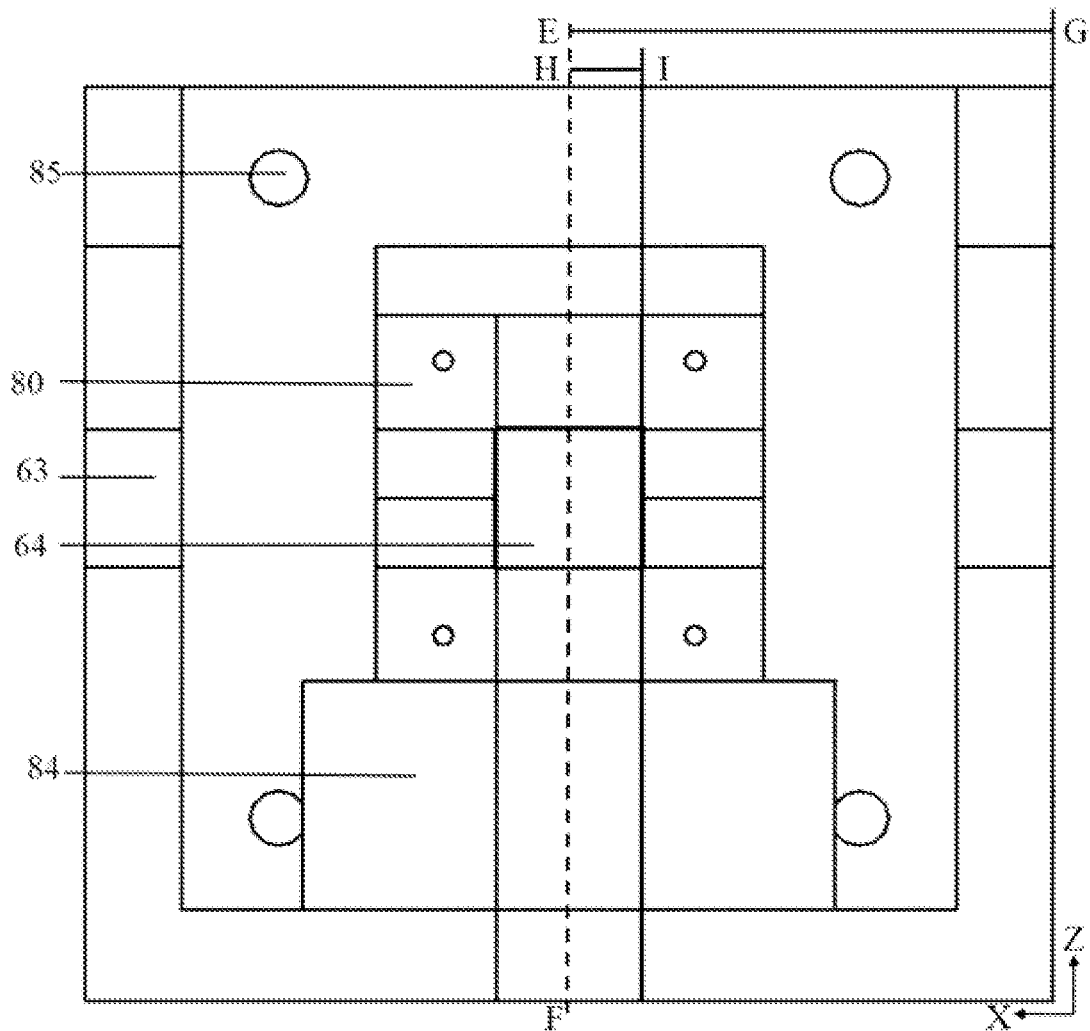
FIG. 7 is a front view showing the assembly of a central cubic box, the positioning, guiding and centering box, a positioning, guiding and centering box cushion block, and the cubic test specimen of the dynamic true triaxial electromagnetic Hopkinson bar system according to the present disclosure.

The positioning, guiding and centering box 80 is designed to have four symmetric parts. When the positioning, guiding and centering box is mounted, firstly, using the threaded rod to connect the first part 76 and the second part 77 of the positioning, guiding and centering box by the threaded rod by means of a bolt connecting hole 83 of the positioning, guiding and centering box; then, mounting the third part 78 of the positioning, guiding and centering box; next, using the threaded rod to connect the first part 76 and the second part 77 of the positioning, guiding and centering box to the third part 78 of the positioning, guiding and centering box by means of the bolt connecting hole 83 of the positioning, guiding and centering box; then, mounting the cubic test specimen 64; and finally, mounting the fourth part 79 of the positioning, guiding and centering box, and using the threaded rod to connect the fourth part of the positioning, guiding and centering box by means of the bolt connecting hole 83 of the positioning, guiding and centering box, so as to form a complete positioning, guiding and centering box 80; subsequently, placing the positioning, guiding and centering box 80 in the center of the upper surface of the positioning, guiding and centering box cushion block 84; using a bolt to fix the positioning, guiding and centering box 80 in the center of the upper surface of the positioning, guiding and centering box cushion block 84 by means of a bolt positioning hole 82 of the positioning, guiding and centering box, so that the positioning, guiding and centering box 80 is quickly and accurately mounted in the center of the central cubic box 63, and the positioning, guiding and centering box and the square holes on each side of the center cube box for installing the square bars are completely centered and aligned; next, placing the square bars along both sides of the square holes in the directions X, Y, and Z of the central cubic box and the positioning, guiding and centering box, respectively, so as to complete the step of quick and precise positioning and centering. FIG. 7 is a front view showing the assembly of the central cubic box 63, the positioning, guiding and centering box 80, the positioning, guiding and centering box cushion block 84, and the cubic test specimen 64.

Figure 8A:
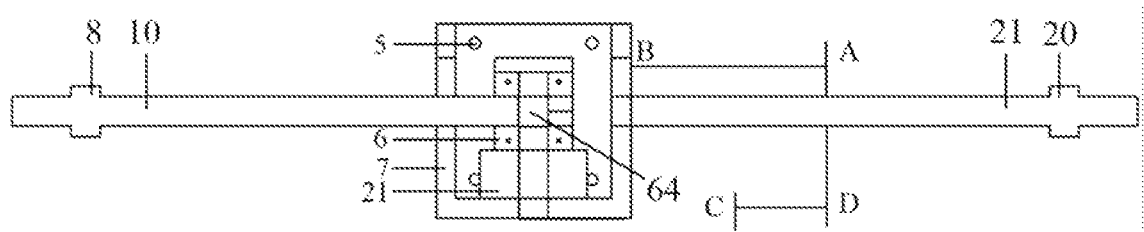
FIG. 8a is a front view of the dynamic true triaxial electromagnetic Hopkinson bar system in the direction X before precise centering according to the present disclosure.
Figure 8B:
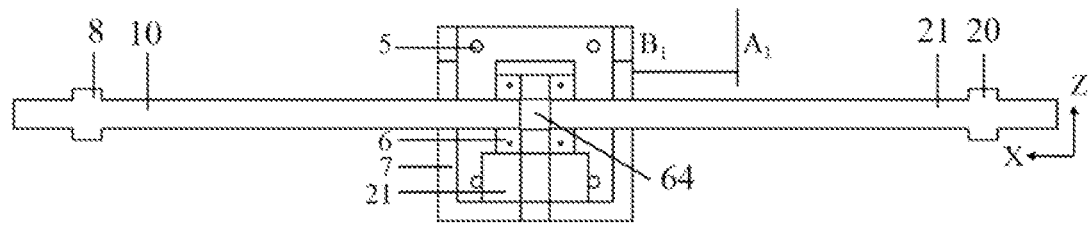
FIG. 8b is a front view of the dynamic true triaxial electromagnetic Hopkinson bar system in the direction X after the precise centering according to the present disclosure.

Then, the infrared laser measuring instrument is used to assist the quickly and precise alignment of the triaxial and six-directional bars. The operating principle is explained as follows by taking the direction X as an example: as shown in FIG. 8a, before the precise centering, the square bar in the direction $X_+$ 10 is placed at an edge of the central cubic box 63; the infrared laser measuring instrument is mounted at a position A on the square bar in the direction $X_+$ 10, and emits an infrared laser from the position A; the infrared laser reaches a position B; therefore, the distance between A and B can be measured; as shown in FIG. 10b, after the precise centering, the square bar in the direction $X_-$ contacts the cubic test specimen 64; the position of the infrared laser measuring instrument remains unchanged relative to the square bar in the direction $X_-$ during centering; at this time, the infrared laser measuring instrument is at a position $A_1$, and the infrared laser reaches a position $B_1$; therefore, the distance between $A_1$ and $B_1$ can be measured; the difference between the two measured distances is a distance between C and D; as shown in FIG. 7, line EF is a center line of the cubic test specimen 64 and the central cubic box 63; EG is half of a side length of the central cubic box 63; HI is half of a side length of the cubic test specimen 64; if the distance CD is equal to the difference between a half of the side length of the central cubic box 63 and a half of the side length of the cubic test specimen 64 (namely CD=EG−HI), then the precise centering and alignment have been completed in the direction X, and subsequent operations and testing processes can be continued. FIG. 8a is a front view of the dynamic-static combined loading true triaxial electromagnetic Hopkinson bar in the direction X before the precise centering, and FIG. 8b is a front view of the dynamic-static combined loading true triaxial electromagnetic Hopkinson bar in the direction X after the precise centering.

Figure 9A:
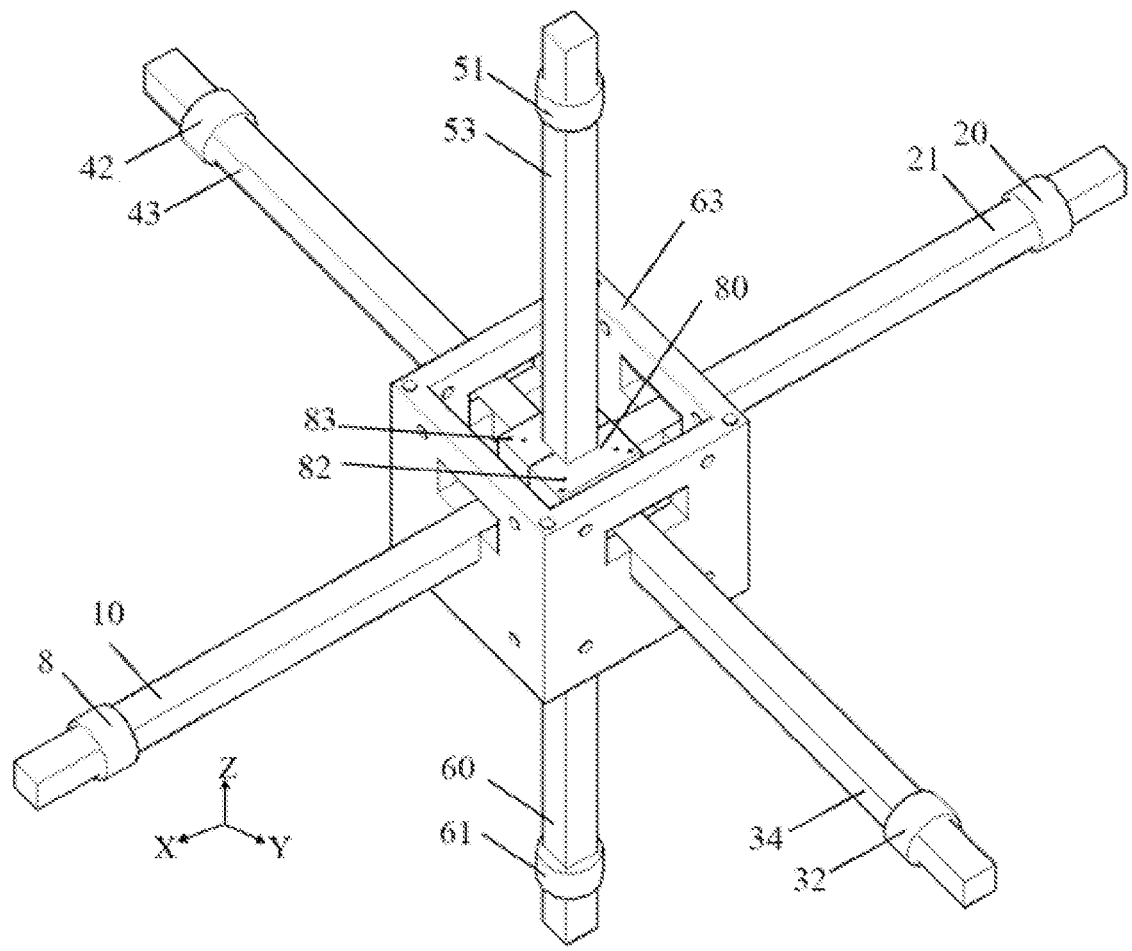
FIG. 9a is a three-dimensional view of the precise positioning and centering apparatus of the dynamic true triaxial electromagnetic Hopkinson bar system according to the present disclosure.
Figure 9B:
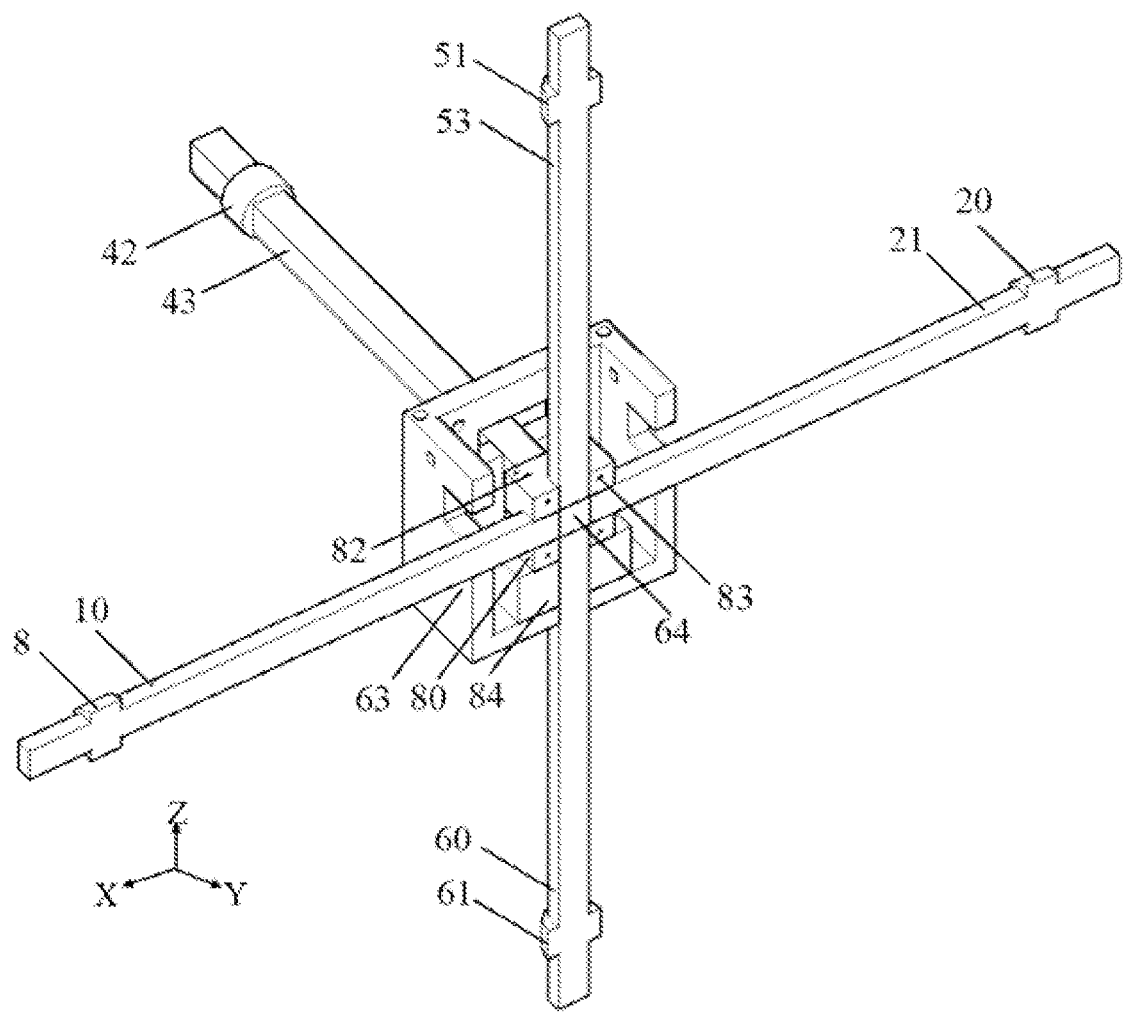
FIG. 9b is a three-dimensional view of a section of the precise positioning and centering apparatus of the dynamic true triaxial electromagnetic Hopkinson bar system according to the present disclosure.

FIG. 9a is a three-dimensional view of the precise positioning and centering apparatus, and FIG. 9b is a three-dimensional view of a section of the precise positioning and centering apparatus. As shown in FIG. 9a, the positioning, guiding and centering box 80 in which the cubic test specimen 64 was mounted is placed in the central cubic box 63 (which is located on the positioning, guiding and centering box cushion block 84); square holes, observation holes, and circular holes are reserved on lateral surfaces of the central cubic box; the square bar in the direction $X_+$ 10 is placed on one side of the square hole in the direction X of the central cubic box 63 and the positioning, guiding and centering box 80, and the square bar 21 in the direction $X_-$ is placed on the other side; the square bar in the direction $Y_+$ 34 is placed on one side of the square hole in the direction Y, and the square bar 43 in the direction $Y_-$ is placed on the other side; the square bar in the direction $Z_+$ 53 is placed on one side of the square hole in the direction Z, and the square bar 60 in the direction $Z_-$ is placed on the other side, so as to complete precise positioning and centering. In FIG. 11b, the positioning, guiding and centering box cushion block 84 is disposed below the positioning, guiding and centering box 80; the cushion block is divided into two parts, and is detachable; bolt positioning holes of the positioning, guiding and centering box cushion block 81 and the bolt positioning holes of the positioning, guiding and centering box 82 are arranged in the positioning, guiding and centering box cushion block; on one hand, the positioning, guiding and centering box cushion block 84 can be fixed in the center of a bottom surface of the central cubic box by means of the bolt positioning holes of the positioning, guiding and centering box cushion block 81, so as to provide an auxiliary platform for quickly and precisely mounting the positioning, guiding and centering box 80 in the center of the central cubic box; on the other hand, the positioning, guiding and centering box can be fixed in the center of the upper surface of the cushion block by means of the bolt positioning holes of the positioning, guiding and centering box 82, so that the positioning, guiding and centering box is ensured to be quickly and precisely mounted in the center of the central cubic box, and the positioning, guiding and centering box and the square holes on each side of the center cube box for installing the square bars are completely centered and aligned.

Figure 10:
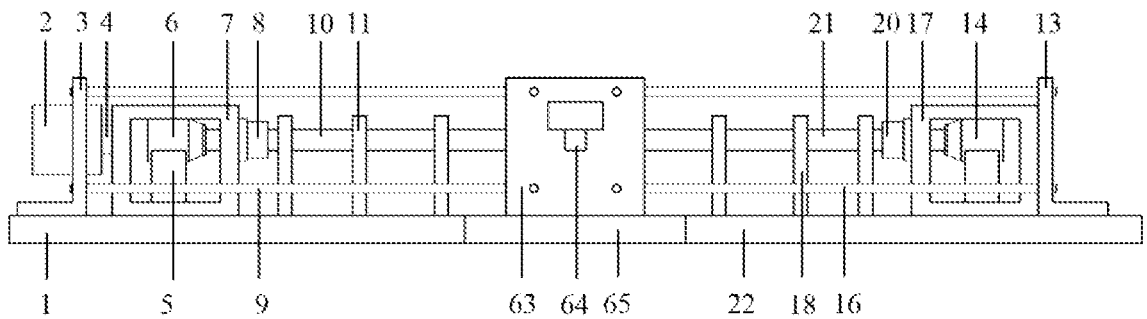
FIG. 10 is a front view of an uni-axial and bidirectional hydraulic loading system in the direction X of the dynamic true triaxial electromagnetic Hopkinson bar system according to the present disclosure.
Figure 11:
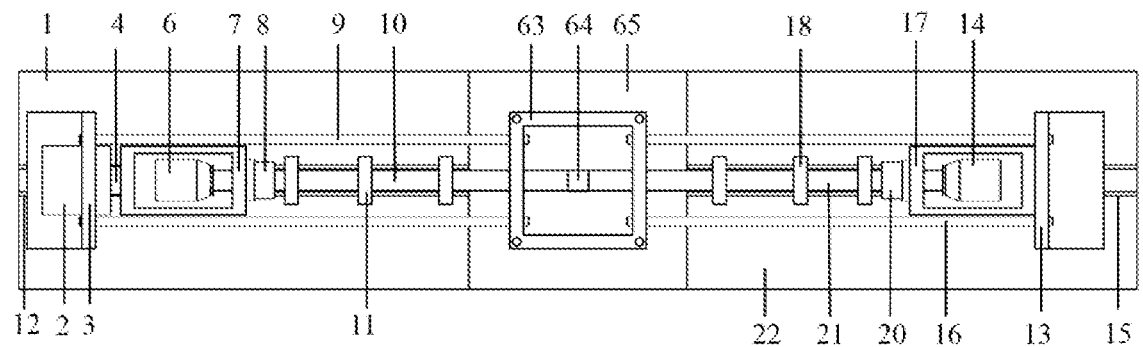
FIG. 11 is a vertical view of the uni-axial and bidirectional hydraulic loading system in the direction X of the dynamic true triaxial electromagnetic Hopkinson bar system according to the present disclosure.

FIGS. 10 and 11 are a front view and a vertical view of dynamic true triaxial electromagnetic Hopkinson bar system in the direction X, respectively. The operating principle of a synchronous-servo-controlled static-dynamic-stress loading system of the dynamic true triaxial electromagnetic Hopkinson bar system is (by taking a uni-axial and bidirectional hydraulic loading system as an example) as follows:

the electromagnetic Hopkinson bar system in the direction $X_+$ consists of a confining-pressure loading end baffle in the direction $X_+$ 3, a confining-pressure loading hydraulic cylinder in the direction $X_+$ 2, a confining-pressure loading actuator in the direction $X_+$ 4, an electromagnetic pulse generator in the direction $X_+$ 6, a link support bar in the direction $X_+$ 9, a square bar in the direction $X_+$ 10, a self-lubricating square bar fixation and support frame in the direction $X_+$ 11, an electromagnetic pulse generator support frame in the direction $X_+$ 5, and a square bar centering and positioning guide rail in the direction $X_+$ 12, wherein the square bar in the direction $X_+$ 10 is fixed by the self-lubricating square bar fixation and support frame in the direction $X_+$ 11; the square bar in the direction $X_+$ 10 and the central cubic box 63 are centered and connected at the square opening in the direction $X_+$ along the square bar centering and positioning guide rail in the direction $X_+$ 12; the confining-pressure loading hydraulic cylinder in the direction $X_+$ 2, the confining-pressure loading actuator in the direction $X_+$ 4, and the confining-pressure loading frame in the direction $X_+$ 7 are combined in series; the confining-pressure loading frame in the direction $X_+$ 7 is connected to the circular bulge in the direction $X_+$ 8 in series, and is used to apply a static confining pressure in the direction $X_+$ to the test specimen along the incident end of the square bar in the direction $X_+$ 10; the electromagnetic pulse generator in the direction $X_+$ 6 and the electromagnetic pulse generator support frame in the direction $X_+$ 5 are placed at the incident end of the square bar in the direction $X_+$ 10 in the confining-pressure loading frame in the direction $X_+$ 7, and are freely and closely attached to the incident end of the square bar in the direction $X_+$ 10, and are used to apply a dynamic stress pulse load in the direction $X_+$ to the cubic test specimen along the incident end of the square bar in the direction $X_+$ 10; the link support bar in the direction $X_+$ 9 connects the confining-pressure loading end baffle in the direction $X_+$ 3 to the central cubic box 63 by means of a link connecting hole 85 of the central cubic box, so as to provide a frame fixation and counterforce support system for applying the static confining pressure in the direction $X_+$. The square bar in the direction $X_-$ 21 is fixed by the self-lubricating square bar fixation and support frame in the direction $X_-$ 18; the square bar in the direction $X_-$ 21 and the central cubic box 63 are centered and connected at the square opening in the direction $X_-$ along the square bar centering and positioning guide rail in the direction $X_-$ 15; the electromagnetic pulse generator in the direction $X_-$ 14 and the electromagnetic pulse generator support frame in the direction $X_-$ 19 are placed at the incident end of the square bar in the direction $X_-$ 21 in the confining-pressure loading frame in the direction $X_-$ 17, and are freely and closely attached to the an incident end of the square bar in the direction $X_-$ 21;

the confining-pressure loading frame in the direction $X_-$ 17 is connected to the circular bulge in the direction $X_-$ 20 in series, and is used to apply a static confining pressure and a dynamic stress pulse load in the direction $X_-$ to the test specimen along the incident end of the square bar in the direction $X_-$ 21; the link support bar in the direction $X_-$ 16 connects the confining-pressure loading and fixing end baffle in the direction $X_-$ 13 to the central cubic box 63 by means of the link connecting hole 85 of the central cubic box, so as to provide a frame fixation and counterforce support system for applying the static confining pressure in the direction $X_-$.

After the apparatus and the cubic test specimen 64 are mounted in the above mode, a high pressure oil pipe is opened to fill the confining-pressure loading hydraulic cylinder in the direction $X_+$ 2 with oil by means of an oil inlet; and the confining-pressure loading actuator in the direction $X_+$ 4 is pushed to move forward and contact the confining-pressure loading frame in the direction $X_+$ 7; an oil pressure is continuously applied to push the confining-pressure loading actuator in the direction $X_+$ 4 to move forward; an axial pressure is transferred to the square bar in the direction $X_+$ 10 by means of the circular bulge 8, and then acts on the cubic test specimen 64, so that the cubic test specimen is under a precise static confining pressure. The cubic test specimen 64 can be loaded with synchronous precise true triaxial static confining pressures, wherein the confining pressure can be servo controlled. The end of the square bar in the direction $X_+$ 10 and the square bar in the direction $X_-$ 21 distal from the cubic test specimen 64 are both free ends; amplitude-controllable and pulse-duration-adjustable impact loads can be applied on the incident ends of the square bar in the direction $X_+$ 10 and the square bar in the direction $X_-$ 21 by means of the electromagnetic pulse generator; the impact loads can be simultaneously loaded in three directions, or can be asynchronously loaded in various directions. Furthermore, the present disclosure can also realize uni-axial and bidirectional and bi-axial and quadr-directional synchronously-controlled precise loading. For the same reasons, the static confining-pressure loading principle in the directions Y and Z is the same as that in the direction X. It should be noted that the static prestress can be synchronously controlled and loaded in the directions X, Y, and Z by means of the static confining-pressure loading servo controlled system, and the load amplitudes can be flexibly set for the static prestress in the directions X, Y, and Z according to test requirements.

In another embodiment, the present disclosure further provides a temperature control system for the dynamic true triaxial electromagnetic Hopkinson bar system, having an in situ heating function during loading.

Figure 12:
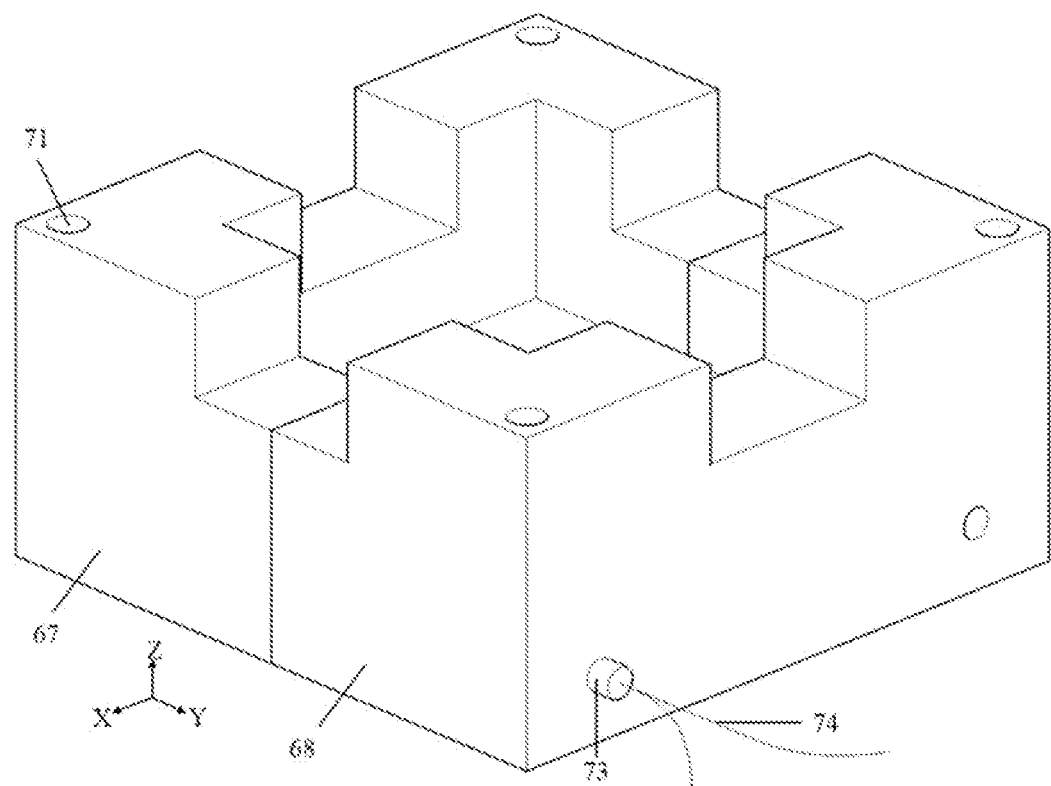
FIG. 12 is a three-dimensional schematic view of a section of the temperature control cabinet of the dynamic true triaxial electromagnetic Hopkinson bar system according to the present disclosure.
Figure 13:
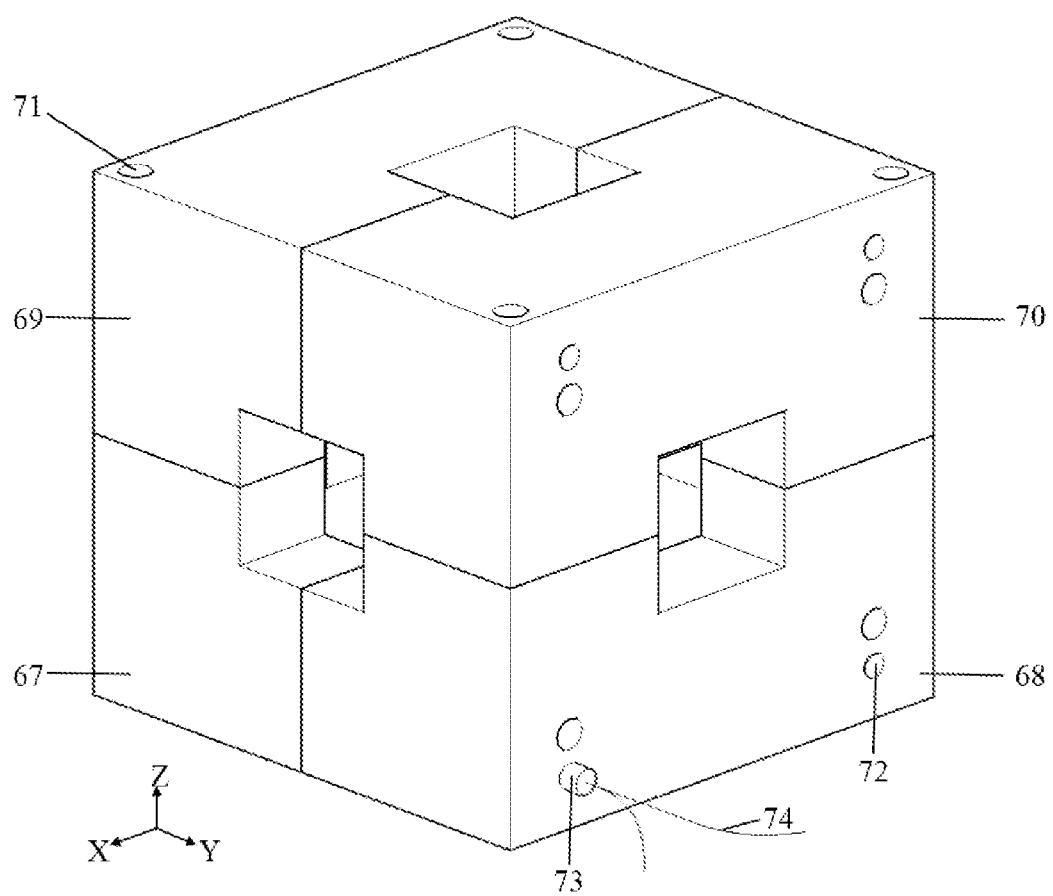
FIG. 13 is a three-dimensional schematic view of the temperature control cabinet of the dynamic true triaxial electromagnetic Hopkinson bar system according to the present disclosure.

FIG. 12 is three-dimensional schematic view of a section of the temperature control cabinet, and FIG. 13 is a three-dimensional schematic view of the temperature control cabinet.

Heating holes 72 are built in the temperature control cabinet 66 of the temperature control apparatus, and heating rods 73 with lead wires 74 are placed in the heating holes 72. The temperature control apparatus under true triaxial dynamic-static combined loading is a prominent advantage of the dynamic true triaxial electromagnetic Hopkinson bar system. The temperature control apparatus is a minitype heating system consisting of an intelligent temperature control sensor and several thermocouples built in the heating cabinet; the volume of the hearth of the heating cabinet is about two times that of the test specimen, with the purposes of keeping a uniform temperature in the hearth and avoiding the test specimen from being non-uniformly heated. During testing, a temperature control software system controls the thermocouples, and sets a temperature rise rate and temperature range (the temperature range is from a normal temperature to 1000° C., preferably 20° C.-300° C.); then, the intelligent temperature control sensor feeds back a real-time temperature to a display software system, thereby ensuring to heat to a preset temperature. After heating to the preset temperature, an electromagnetic triaxial and six-directional synchronous-coordinated-control loading system can be used to apply a dynamic impact load to the test specimen, so as to carry out relevant dynamics tests, and implement the research on dynamic true triaxial loading tests on the cubic test specimen under the in situ coupled action of temperature and static pressure.

Figure 14:
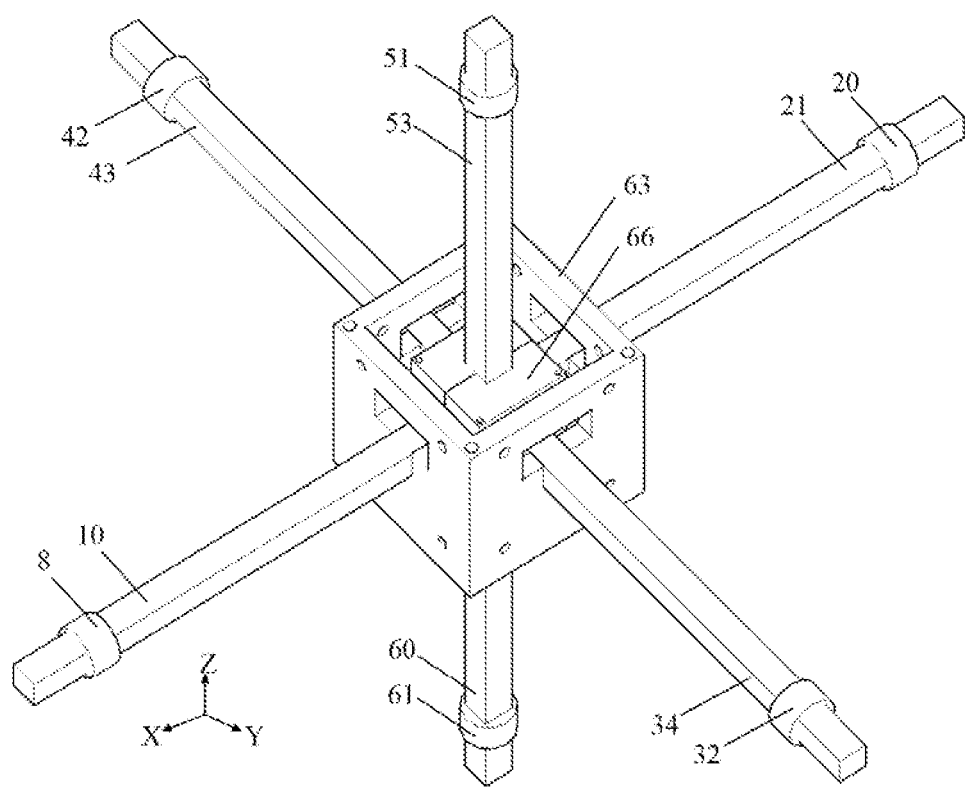
FIG. 14 is a three-dimensional view of the temperature-pressure coupling structure of the dynamic true triaxial electromagnetic Hopkinson bar system according to the present disclosure.
Figure 15:
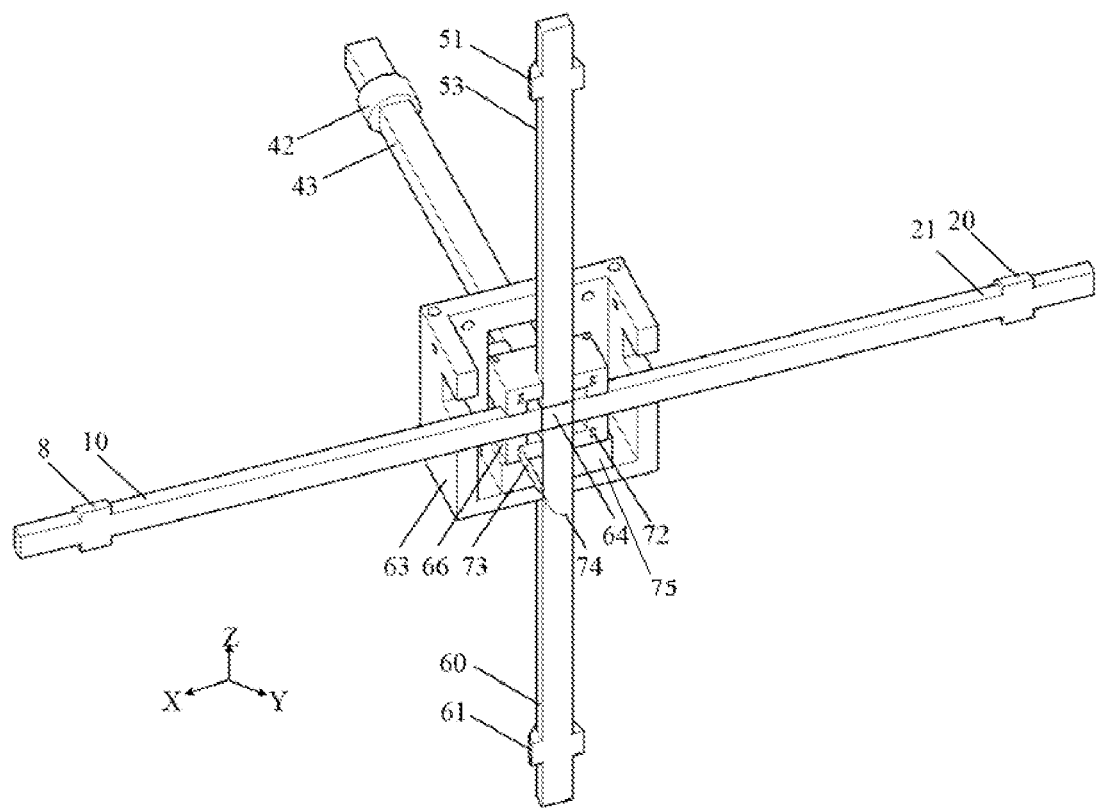
FIG. 15 is a three-dimensional view of a section of the temperature-pressure coupling structure of the dynamic true triaxial electromagnetic Hopkinson bar system according to the present disclosure.

FIG. 14 is a three-dimensional view of a temperature-pressure coupling structure; FIG. 15 is a three-dimensional view of a section of the temperature-pressure coupling structure.

A temperature control method of the temperature control system of the dynamic true triaxial electromagnetic Hopkinson bar system includes the following steps:

assembling the temperature control cabinet 66: firstly, connecting the first part 67 and second part 68 of the temperature control cabinet 66; then, mounting the third part 69; next, connecting the first part 67 and the second part 68 to the third part 69; and finally mounting and fixedly connecting the fourth part 70 of the temperature control cabinet to form a complete temperature control apparatus;

mounting a temperature control cabinet cushion block 75: placing the detachable temperature control cabinet cushion block 75 in the center of the bottom surface of the central cubic box 63;

after the temperature control cabinet cushion block 75 is mounted, placing the temperature control cabinet 66 in the center of the upper surface of the temperature control cabinet cushion block 75, and locating the test specimen 64 in the center of the temperature control cabinet 66, so as to complete the mounting step of the temperature control system of the dynamic true triaxial electromagnetic Hopkinson bar system.

After completing the above step, heating the test specimen 64, controlling thermocouples by means of a temperature control software system, setting a temperature rise rate and temperature range (the temperature range is from a normal temperature to 1000° C., preferably 20° C.-300° C.); then, feeding back a real-time temperature to a display software system by means of an intelligent temperature control sensor, heating to a preset temperature, and then maintaining the test specimen 64 in a constant temperature state.

After completing the above step, applying a static confining pressure to the test specimen 64 (the static confining pressure is applied in the mode as shown in FIGS. 6 and 7); after the static confining pressure is applied, using the electromagnetic triaxial and six-directional synchronous-coordinated-control loading system to apply a dynamic impact load to the test specimen, so as to apply the impact load to the test specimen, and implement the research on dynamic true triaxial loading tests on the cubic test specimen under the in situ coupled action of temperature and static pressure.

The present disclosure is described in detail above with reference to specific preferred embodiments. However, the specific embodiments of the present disclosure are not considered to be limited by the descriptions only. For a person skilled in the art, any simple deductions or substitutions made without departing from the concept of the present disclosure should be all concluded in the protection scope of the present disclosure.

What is claimed is:

1. A dynamic true triaxial electromagnetic Hopkinson bar system, comprising a central cubic box, wherein
confining-pressure loading systems, electromagnetic pulse generators, square bars, circular bulges, and self-lubricating square bar fixation and support frames in directions $X_+$, $X_-$, $Y_+$, $Y_-$, $Z_+$, and $Z_-$ are respectively symmetrically arranged by taking the central cubic box as a symmetric center;
the central cubic box completely opens in the direction $Z_+$;
a square opening is disposed at a center of the central cubic box in each direction of $X_+$, $X_-$, $Y_+$, $Y_-$, and $Z_-$, respectively;
a size of the square openings is the same as that of the square bar;
the central cubic box is disposed on a center of an upper surface of a central support platform;
the central cubic box and a horizontal cruciform support platform form an orthogonal coordinate system, wherein the horizontal cruciform support platform comprises the central support platform and support platforms in the directions of $X_+$, $X_-$, $Y_+$, and $Y_-$; and
the six systems in the directions $X_+$, $X_-$, $Y_+$, $Y_-$, $Z_+$, and $Z_-$ together construct the dynamic true triaxial electromagnetic Hopkinson bar system.

2. The dynamic true triaxial electromagnetic Hopkinson bar system according to claim 1, wherein
the confining-pressure loading systems of two directions on a same axis comprises a confining-pressure loading hydraulic cylinder, a confining-pressure loading actuator, and confining-pressure loading frames;
the confining-pressure loading frames in the directions $X_+$, $X_-$, $Y_+$, $Y_-$, $Z_+$, and $Z_-$ are respectively symmetrically arranged by taking the central cubic box as a symmetric center;
by taking the central cubic box as a symmetric center, the confining-pressure loading hydraulic cylinder and the confining-pressure loading actuator are arranged in one of the directions $X_+$ and $X_-$;
the confining-pressure loading hydraulic cylinder and the confining-pressure loading actuator are arranged in one of the directions $Y_+$ and $Y_-$; and
the confining-pressure loading hydraulic cylinder and the confining-pressure loading actuator are arranged in one of the directions $Z_+$ and $Z_-$.

3. The dynamic true triaxial electromagnetic Hopkinson bar system according to claim 2, wherein
the electromagnetic Hopkinson bar system comprises a synchronous-servo-controlled static-dynamic-stress loading system; and the synchronous-servo-controlled static-dynamic-stress loading system comprises:
the square bars each being fixed by one of the self-lubricating square bar fixation and support frames, wherein the square bar and the central cubic box are centered and connected at the square opening;
the confining-pressure loading hydraulic cylinder, the confining-pressure loading actuator, and the confining-pressure loading frame that are combined in series;
the electromagnetic pulse generator that is placed in the confining-pressure loading frame at an incident end of the square bar, and is freely and closely adhered to the incident end of the square bar;
the confining-pressure loading frame and the circular bulge that are combined in series; and
the circular bulge that is located at the incident end of the square bar, wherein the distance between the circular bulge and the incident end of the square bar is 3%-7% of the length of the square bar.

4. The dynamic true triaxial electromagnetic Hopkinson bar system according to claim 3, wherein the distance from the circular bulge to a loading end of an incident stress wave of the square bar is 3%-7% of the length of the square bar.

5. The dynamic true triaxial electromagnetic Hopkinson bar system according to claim 3, wherein the length of the circular bulge is 1.5%-4% of the length of the square bar.

6. The dynamic true triaxial electromagnetic Hopkinson bar system according to claim 3, wherein the diameter of the circular bulge is 1.5-2.5 times the side length of a cross section of the square bar.

7. The dynamic true triaxial electromagnetic Hopkinson bar system according to claim 3, wherein the dynamic true triaxial electromagnetic Hopkinson bar system further comprises a square bar centering and positioning guide rail; the square bar and the central cubic box are centered and connected at the square opening along the square bar centering and positioning guide rail.

8. The dynamic true triaxial electromagnetic Hopkinson bar system according to claim 3, wherein the dynamic true triaxial electromagnetic Hopkinson bar system further comprises an electromagnetic pulse generator support frame; the electromagnetic pulse generator support frame is placed in the confining-pressure loading frame at the incident end of the square bar; and the electromagnetic pulse generator support frame supports the electromagnetic pulse generator.

9. The dynamic true triaxial electromagnetic Hopkinson bar system according to claim 3, wherein a link support bar, a confining-pressure loading end baffle, and a confining-pressure loading and fixing end baffle are disposed in the directions $X_+$, $X_-$, $Y_+$, and $Y_-$, respectively; the confining-pressure loading end baffle and the confining-pressure loading and fixing end baffle are connected to the central cubic box by means of the link support bar.

10. The dynamic true triaxial electromagnetic Hopkinson bar system according to claim 3, wherein a vertical fixation and support frame is disposed in the directions $Z_+$ and $Z_-$, respectively; the vertical fixation and support frame is connected to the central cubic box, so as to provide a frame fixation and counterforce supporting system for applying static confining pressures in the directions $Z_+$ and $Z_-$.

11. The dynamic true triaxial electromagnetic Hopkinson bar system according to claim 2, wherein the dynamic true triaxial electromagnetic Hopkinson bar system further comprises a positioning and centering system; the positioning and centering system comprises a positioning, guiding and centering box; the positioning, guiding and centering box is a cube; a square hole is reserved on each surface of the positioning, guiding and centering box; the size of the square holes on the six surfaces of the positioning, guiding and centering box is consistent with the size of the square bar of the Hopkinson bar; the size of an inner cavity of the positioning, guiding and centering box is consistent with the size of a cubic test specimen; and the positioning, guiding and centering box is designed to have four symmetric parts.

12. A method for using the dynamic true triaxial electromagnetic Hopkinson bar system of claim 11 to perform positioning, comprising the following steps:

assembling the positioning, guiding and centering box: firstly, connecting two lower parts of the positioning, guiding and centering box; then, mounting a third part; next, connecting the two lower parts to the upper third part; then, mounting a cubic test specimen before mounting and fixedly connecting the final part to form a complete positioning and centering apparatus;

mounting a positioning, guiding and centering box cushion block, the positioning, guiding and centering box cushion block is a detachable cushion block: firstly, placing the positioning, guiding and centering box cushion block in the center of a bottom surface of the central cubic box; then, using a bolt to fix the positioning, guiding and centering box cushion block in the center of the bottom surface of the central cubic box by means of a bolt positioning hole, so as to provide an auxiliary platform for quickly and precisely mounting the positioning, guiding and centering box in the center of the central cubic box;

after completing the above step, placing the positioning, guiding and centering box in the center of an upper surface of the positioning, guiding and centering box cushion block; then, using bolts to fix the positioning, guiding and centering box in the center of the upper surface of the positioning, guiding and centering box cushion block by means of bolt positioning holes, so that the positioning, guiding and centering box is mounted in the center of the central cubic box, and the positioning, guiding and centering box and the square holes on each side of the center cube box for installing the square bars are completely centered and aligned; next, placing the square bars along both sides of the square holes in directions X, Y, and Z of the central cubic box and the positioning, guiding and centering box, respectively, so as to complete the step of quick and precise positioning and centering;

after completing the above step, using an infrared laser measuring instrument to assist the quick and precise alignment of triaxial bars in six directions; the operating principle is explained as follows by taking the direction X as an example: before the precise centering, a square bar in the direction X_ is placed at an edge of the central cubic box; the infrared laser measuring instrument is disposed at a position A, and emits an infrared laser from the position A; the infrared laser reaches a position B; therefore, the distance between A and B can be measured; after the precise centering, the square bar in the direction X_ contacts the cubic test specimen; a position of the infrared laser measuring instrument remains unchanged relative to the square bar in the direction X_ during alignment; at this time, the infrared laser measuring instrument is at a position $A_1$, and the infrared laser reaches a position $B_1$; therefore, the distance between $A_1$ and $B_1$ can be measured; the difference between the two measured distances is a distance between C and D; line EF is a center line of the cubic test specimen and the central cubic box; EG is half of a side length of the central cubic box; HI is half of a side length of the cubic test specimen; if the distance CD is equal to the difference between a half of the side length of the central cubic box and a half of the side length of the cubic test specimen, namely CD=EG–HI, then the precise centering and alignment have been completed in the direction X, and subsequent operations and testing processes can be continued.

13. The dynamic true triaxial electromagnetic Hopkinson bar system according to claim 11, wherein circular holes are respectively reserved on each surface of the positioning, guiding and centering box; the size of the circular holes is consistent with the size of a threaded rod; the four parts of the positioning, guiding and centering box are connected by means of threaded rods and nuts, so that the detachable positioning, guiding and centering box is combined to form an overall structure.

14. The dynamic true triaxial electromagnetic Hopkinson bar system according to claim 2, wherein the dynamic true triaxial electromagnetic Hopkinson bar system further comprises a temperature control system; the temperature control system comprises a temperature control apparatus; the temperature control apparatus comprises a temperature control cabinet; heating holes are built in the temperature control cabinet; heating rods with lead wires are placed in the heating holes; the volume of a hearth of the temperature control cabinet is 1.5-2.5 times that of the test specimen; a square hole is respectively reserved on each surface of the temperature control cabinet; the size of the square holes on the six surfaces of the temperature control cabinet is consistent with the size of a cross section of the square bar of the Hopkinson bar; and the temperature control cabinet is designed to have four symmetric parts.

15. The dynamic true triaxial electromagnetic Hopkinson bar system according to claim 14, wherein the distance from the circular bulge to the loading end of the incident stress wave of the square bar is 3%-7% of the length of the square bar.

16. The dynamic true triaxial electromagnetic Hopkinson bar system according to claim 14, wherein the length of the circular bulge is 1.5%-4% of the length of the square bar.

17. The dynamic true triaxial electromagnetic Hopkinson bar system according to claim 14, wherein the diameter of the circular bulge is 1.5-2.5 times the side length of the cross section of the square bar.

18. A method for using the dynamic true triaxial electromagnetic Hopkinson bar system of claim 14 to control temperature, comprising the following steps:

assembling the temperature control cabinet: firstly, connecting a first part and a second part of the temperature control cabinet; then, mounting a third part; next, connecting the first part and the second part to the third part; and finally mounting and fixedly connecting a fourth part of the temperature control cabinet to form a complete temperature control apparatus;

mounting a temperature control cabinet cushion block: assembling the temperature control cabinet cushion block which is disposed in the central cubic box, and placing the temperature control cabinet cushion block in the center of a bottom surface of the central cubic box;

after completing the above step, placing the temperature control cabinet in the center of an upper surface of the temperature control cabinet cushion block, and locating the test specimen in the center of the temperature control cabinet, so as to complete a plurality of mounting steps of the temperature control system of the dynamic true triaxial electromagnetic Hopkinson bar system;

after completing the above step, heating the test specimen, controlling a thermocouple by means of a temperature control software system, setting a temperature rise rate and a temperature range; then, feeding back a real-time temperature to a display software system by means of an intelligent temperature control sensor, thereby ensuring heating to a preset temperature, and then maintaining the test specimen in a constant temperature state.

19. The method for using dynamic true triaxial electromagnetic Hopkinson bar system to control temperature according to claim 18, wherein the temperature range is from normal temperature to 1000° C.

20. The method for using dynamic true triaxial electromagnetic Hopkinson bar system to control temperature according to claim 19, wherein the temperature range is 20° C.-300° C.

* * * * *